United States Patent
Koleszar et al.

(10) Patent No.: US 8,407,903 B2
(45) Date of Patent: Apr. 2, 2013

(54) ROTATING CONSTRUCTION LASER, IN PARTICULAR A SELF-COMPENSATING ROTATING CONSTRUCTION LASER, AND METHOD FOR MEASURING A TILT OF AN AXIS OF ROTATION OF A CONSTRUCTION LASER

(75) Inventors: Christopher Koleszar, Widnau (CH); Martin Winistoerfer, Hinterforst (CH)

(73) Assignee: Leica Geosystems AG, Heerbrugg (CH)

( * ) Notice: Subject to any disclaimer, the term of this patent is extended or adjusted under 35 U.S.C. 154(b) by 238 days.

(21) Appl. No.: 13/002,409

(22) PCT Filed: Jul. 10, 2009

(86) PCT No.: PCT/EP2009/058807
§ 371 (c)(1),
(2), (4) Date: Jan. 12, 2011

(87) PCT Pub. No.: WO2010/004024
PCT Pub. Date: Jan. 14, 2010

(65) Prior Publication Data
US 2011/0099822 A1 May 5, 2011

(30) Foreign Application Priority Data
Jul. 10, 2008 (EP) .................................. 08104698

(51) Int. Cl.
*G01C 15/00* (2006.01)
(52) U.S. Cl. .......................................... 33/285; 33/291
(58) Field of Classification Search .................... 33/285, 33/286, 290, 291, DIG. 21
See application file for complete search history.

(56) References Cited

U.S. PATENT DOCUMENTS

| 4,717,251 | A |   | 1/1988  | Wells et al. |
|-----------|---|---|---------|--------------|
| 4,751,782 | A | * | 6/1988  | Ammann ........................ 33/291 |
| 4,993,161 | A | * | 2/1991  | Borkovitz ....................... 33/291 |
| 5,026,985 | A | * | 6/1991  | Ishizuka et al. ......... 250/231.16 |
| 5,485,266 | A |   | 1/1996  | Hirano et al. |
| 5,486,690 | A |   | 1/1996  | Ake |
| 5,852,493 | A | * | 12/1998 | Monnin ..................... 356/141.1 |
| 6,119,355 | A |   | 9/2000  | Raby |
| 6,688,009 | B2| * | 2/2004  | Haijima et al. ................. 33/281 |
| 7,059,058 | B2| * | 6/2006  | Kousek et al. .................. 33/290 |

(Continued)

FOREIGN PATENT DOCUMENTS

| EP | 2144037 A1 * | 1/2010 |
| WO | 03/019223 A2 | 3/2003 |

(Continued)

*Primary Examiner* — Christopher Fulton
(74) *Attorney, Agent, or Firm* — Maschoff Brennan

(57) ABSTRACT

The invention relates to a rotating construction laser (1), in particular a self-compensating construction laser. The construction laser (1) comprises a base (2,115) and a laser unit (3,114) for emitting a laser beam (11,83) rotating around an axis (18) of rotation so that the rotating laser beam (11,83) defines a laser plane. Therein, the laser unit (3,114) is built and tiltably arranged to the base (2,115) in such a way, that the axis (18) is tiltable in at least one direction. Furthermore, a tilt sensor (19,96,109) is present for measuring the tilt of the axis (18). According to the invention, the tilt sensor (19,96,109) is supported by a sensor platform being pivotable with respect to the laser unit around the axis (18) between at least two defined pivoting-positions (54,55,70-22) in such a way, that the tilt of the axis (18) is measurable by the tilt sensor (19,96, 109) in the at least two pivoting-positions (54,55, 70-22).

22 Claims, 7 Drawing Sheets

U.S. PATENT DOCUMENTS

| | | | |
|---|---|---|---|
| 7,096,591 B2 * | 8/2006 | Glantz et al. | 33/290 |
| 7,127,822 B2 * | 10/2006 | Kumagai et al. | 33/290 |
| 7,370,427 B2 | 5/2008 | Ammann et al. | |
| 7,454,842 B2 * | 11/2008 | Kodaira | 33/290 |
| 7,520,064 B2 * | 4/2009 | Hayase et al. | 33/290 |
| 7,587,832 B2 * | 9/2009 | Hajmousa et al. | 33/290 |
| 7,861,427 B2 * | 1/2011 | Schumacher et al. | 33/291 |
| 8,087,176 B1 * | 1/2012 | Hayes et al. | 33/280 |

FOREIGN PATENT DOCUMENTS

| | | |
|---|---|---|
| WO | 2005/103617 A1 | 11/2005 |
| WO | 2008/052590 A1 | 5/2008 |

* cited by examiner

ROTATING CONSTRUCTION LASER, IN PARTICULAR A SELF-COMPENSATING ROTATING CONSTRUCTION LASER, AND METHOD FOR MEASURING A TILT OF AN AXIS OF ROTATION OF A CONSTRUCTION LASER

The invention relates to a rotating construction laser and a method for measuring a tilt of an axis of rotation of a rotating construction laser.

BACKGROUND

Rotating construction lasers are well known in the prior art. For example, in U.S. Pat. No. 7,370,427 a construction laser with at least one laser beam defining a plane is described. The construction laser has a laser unit that is tiltable relative to a housing around at least one swiveling axis. The construction laser includes at least one leveling sensor which is sensitive to the swiveling axis for a highly precise orientation to the gravitational field. The device further includes one tilt sensor which is sensitive to the swiveling axis for direct measurement of an inclination angle relative to the gravitational field.

Disadvantageous in this embodiment is that a level sensor and a tilt sensor are needed to perform the tilt measurement with an acceptable degree of accuracy. Furthermore, the laser beam unit periodically needs to return to its level position for recalibrating the tilt sensor.

Likewise, WO 2008/052590 A1 relates to indicating a grade, e. g. in construction applications, using a laser beam. The laser beam is emitted from a laser unit to a desired direction having a grade angle with regard to the level angle. A level sensor is provided for adjusting the level angle and a grade sensor is provided for indicating a grade angle on the basis of the level angle from the level sensor.

This device also requires two sensors to correctly indicate the grade.

According to U.S. Pat. No. 5,485,266, fixed tilt detectors are fixed in planes crossing perpendicularly to each other of a shaft center of a laser projector, and tilting tilt detectors are mounted on a plate which is tiltable with respect to the shaft center of the laser projector. The laser projector is level in such a manner that the fixed tilt detectors indicate horizontal direction. The tilting tilt detectors are aligned with the fixed tilt detectors and indicate a horizontal direction. Thus, a horizontal reference plane is obtained. The tilting tilt detectors are tilted with the fixed tilt detectors as a reference and the laser projector is leveled so that the tilting tilt detectors indicate horizontal direction. Thus, a reference plane tilted at an arbitrary angle is obtained.

This device also requires multiple tilt sensors.

As can be seen from the prior art, two tilt sensors are usually used for measuring the tilt of an axis of rotation of a rotating construction laser with high accuracy. One of these sensors is a level sensor which is of very high precision and very limited range and which is used to calibrate the grade sensor or tilt sensor, which has a broader range, but is less precise.

SUMMARY

It is the objective of the present invention to create a construction laser, in particular a rotating construction laser, and a method for measuring the tilt of an axis of rotation of a construction laser that requires only one sensor for measuring the tilt of an axis of rotation of a means for generating a laser plane and which enables a user to measure the tilt of the axis of rotation with very high accuracy. Furthermore, the construction laser should be able to continuously generate a tilted laser plane without returning periodically to a level position.

This object is achieved by realising the features of the independent claims. Features which further develop the invention in an alternative or advantageous manner are described in the dependent patent claims.

The inventive rotating construction laser, in particular self-compensating rotating construction laser, comprises a base; a laser unit for emitting a laser beam rotating around an axis of rotation so that the rotating laser beam defines a laser plane, wherein the laser unit is built and tiltably arranged to the base in such a way, that the axis is tiltable in at least one direction; and a tilt sensor for measuring the tilt of the axis.

According to the invention, the tilt sensor is supported by a sensor platform being pivotable with respect to the laser unit around the axis between at least two defined pivoting-positions in such a way, that the tilt of the axis is measurable by the tilt sensor in the at least two pivoting-positions.

Therein, the sensor platform is a structure that carries the tilt sensor.

The device requires only one tilt sensor to accurately measure the tilt of the axis of rotation. This is achieved by measuring the tilt in at least two different positions and computing the effective tilt. Thereby errors are eliminated that may result from the tilt sensor, e.g. temperature drift or hysteresis error. The rotating construction laser according to the invention is less extensive regarding its design compared to other devices known in the prior art. Furthermore, it does not require the construction laser to return to the level position in order to re-calibrate the tilt sensor.

Exemplarily, the laser unit can be built in such a way, that the laser beam rotates around the axis with a rotational speed of at least 120 rpm, in particular at least 500 rpm, especially at least 1000 rpm.

The sensor platform—together with the tilt sensor—is pivotable between at least two defined pivoting-positions. A defined pivoting-position is a pivotal position which can be occupied by the platform and in which a tilt measurement is taken. This enables continuous measurements of the tilt of the axis of rotation. Thus, the tilt of the laser unit and the axis of rotation can be adjusted during operation. Furthermore, two positions of the at least two pivoting-positions may be diametrically opposite of each other relative to the axis. Thus, alignment errors of the tilt sensor relative to the axis of rotation can be computationally eliminated.

Therefore, the rotating construction laser may comprise a calculation unit being designed in such a way, that a tilt value for the axis is derived by considering a measurement taken by the tilt sensor in each of the at least two pivoting-positions. The calculation unit may also be designed in such a way, that the tilt sensor is calibrated, in particular re-calibrated, by considering a measurement taken by the tilt sensor in each of the at least two pivoting-positions.

In another embodiment, the sensor platform is pivotable with respect to the laser unit around the axis between at least three defined pivoting-positions, in particular between an uneven number of defined pivoting-positions. The average tilt may be computed taking into account the positions at which the measurements were taken.

The laser unit—as a means for generating the laser plane, can further include an axle that is concentric to the axis of rotation, wherein the sensor platform is pivotably mounted to the axle. The axle provides a means around which the sensor platform may be pivoted or rotated. It may also serve as an axle for another part of the laser unit.

In another embodiment two bearings are located between a sensor platform and the axle, wherein the bearings are arranged at a distance from another of at least one bearing width. According to this embodiment, the pivoting movement of the sensor platform is very stable with respect to the axis of rotation of the laser beam. Thus, the tilt sensor is always closely aligned with the axis of rotation—in the defined positions as well as during pivoting motion. This helps to reduce errors resulting from the pivotable mounting of the sensor platform to the axle.

A printed circuit board may be provided between the tilt sensor and the sensor platform. The tilt sensor may be connected to the circuit board, and the circuit board again may be connected to a control unit. This represents an efficient design for transmitting the signal output of the tilt sensor to the control unit.

In another particular embodiment, the tilt sensor is pivoted by an engaging pin that is provided on a rotating part of the laser unit. Thus, just one motor is required to rotate the laser beam and to pivot the tilt sensor.

The tilt sensor can alternatively be pivoted by a pivoting motor according to another embodiment of the invention. The pivoting motor may be switched by position switches. The position switches include a light emitting diode (LED) and a photo detector which are placed on parts that are moving relative to each other. The LED is placed at a defined position of the tilt sensor. If the photo detector detects a change in the light intensity, it will turn off the pivoting motor exactly at the defined position. Alternatively, the pivoting motor may be a stepper motor. The stepper motor is programmed to turn the sensor platform a predefined number of steps which corresponds to the distance between the defined positions. The counter of the stepper motor is reset by the position switches.

The tilt sensor may be an accelerometer. The accelerometer may be a part of an integrated circuit. Accelerometers have been shown to provide tilt measurements of very high accuracy.

Summed up, in other words, the construction laser according the invention, in particular self-compensating rotating construction laser, comprises a base; a means for generating a laser beam plane, wherein the laser beam plane is created by a laser beam rotating around an axis of rotation, and wherein the means for generating the laser beam plane are pivotably mounted to the base, wherein the means for generating the laser beam plane is pivotable relative to an X-axis and/or a Y-axis; and a tilt sensor for measuring the tilt of the axis of rotation. Therein, the tilt sensor is pivotable around the axis of rotation for measuring the tilt of the axis of rotation in at least two positions.

The invention also relates to a method for determining a tilt for an axis of rotation of a rotating construction laser, the rotating construction laser.

The rotating construction laser comprises a base; a laser unit for emitting a laser beam rotating around the axis so that the rotating laser beam defines a laser plane, wherein the laser unit is built and tiltably arranged to the base in such a way, that the axis is tiltable; and a tilt sensor for measuring the tilt of the axis.

According to the invention, the tilt sensor is pivotable with respect to the laser unit around the axis between at least two defined pivoting-positions. Furthermore, a measurement of the tilt is taken by the tilt sensor in each of the at least two pivoting-positions and the tilt value for the axis is derived by considering the measurements taken by the tilt sensor in the at least two pivoting-positions. Alternatively, the measurements taken by the tilt sensor in the at least two pivoting-positions may also be considered for calibrating, in particular re-calibrating, the tilt sensor.

Exemplarily, the two positions of the at least two pivoting-positions can be opposite of each other relative to the axis.

Furthermore, the tilt sensor can be pivotable with respect to the laser unit around the axis between at least three defined pivoting-positions, in particular between an uneven number of defined pivoting-positions. Hence, the tilt value for the axis can be derived by considering a measurement taken by the tilt sensor in each of the defined pivoting-positions.

For example, the laser beam of the construction laser rotates around the axis with a rotational speed of at least 120 rpm, in particular at least 500 rpm, especially at least 1000 rpm.

Hence, according to this method, the tilt of the axis of rotation can be measured with a tilt sensor at a main position of the tilt sensor and at least one other position of the tilt sensor, wherein a compensating value can be generated out of the tilt measurement at the other position to adjust the tilt measurement of the tilt sensor at the main position.

The tilt sensor may be pivoted between at least two defined positions. Preferably, the two positions are opposite of each other relative to the axis of rotation.

According to another particular embodiment, the tilt sensor is pivoted between an uneven number of defined positions. The results of the tilt measurements at the defined positions can be advantageously used to calibrate the sensitivity of the tilt sensor.

BRIEF DESCRIPTION OF THE DRAWINGS

The invention will now be explained in detail by referring to exemplary embodiments that are accompanied by figures, in which.

DETAILED DESCRIPTION OF THE DRAWINGS

Figure 1:
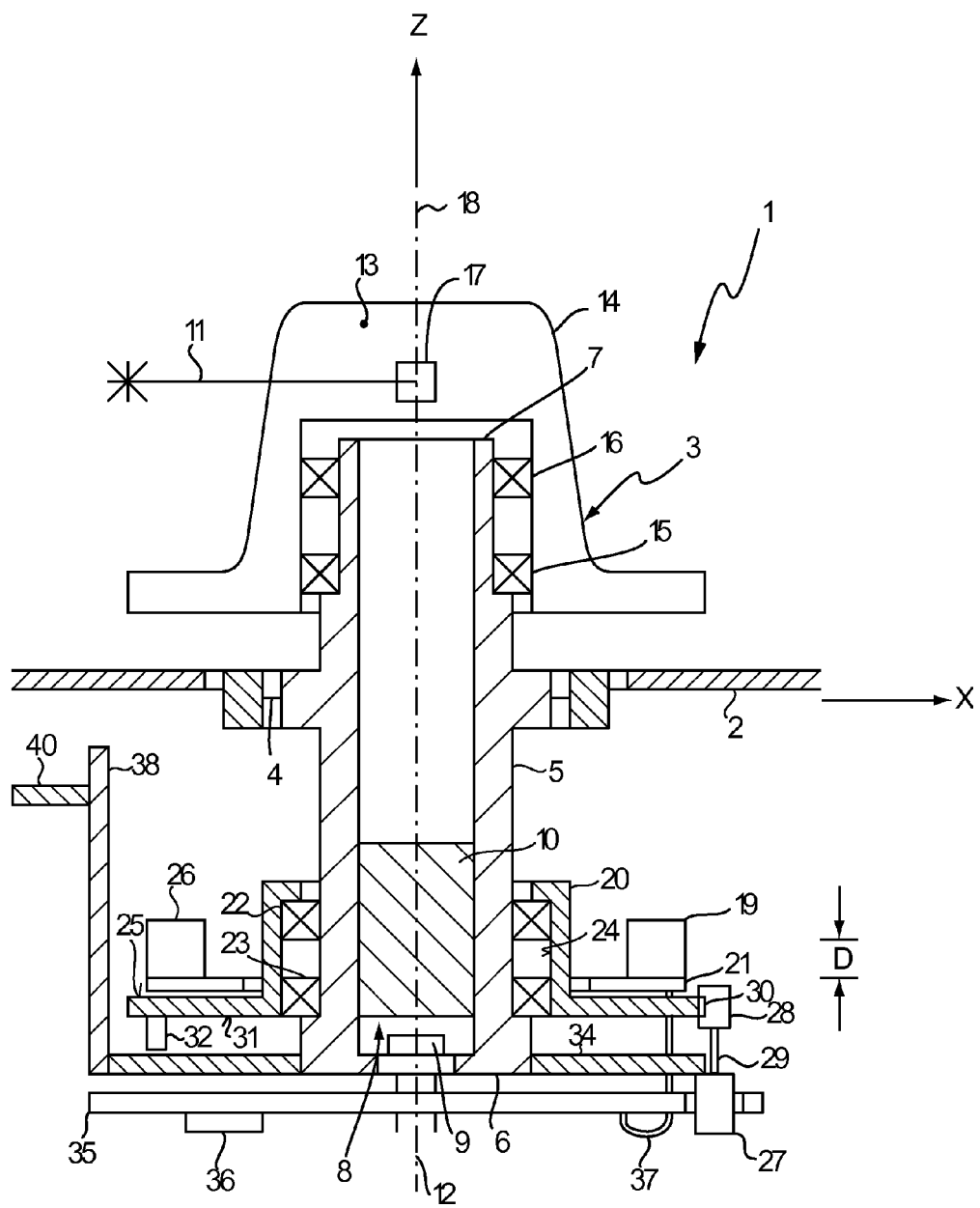
FIGS. 1 and 2 are two views of a construction laser.
Figure 2:
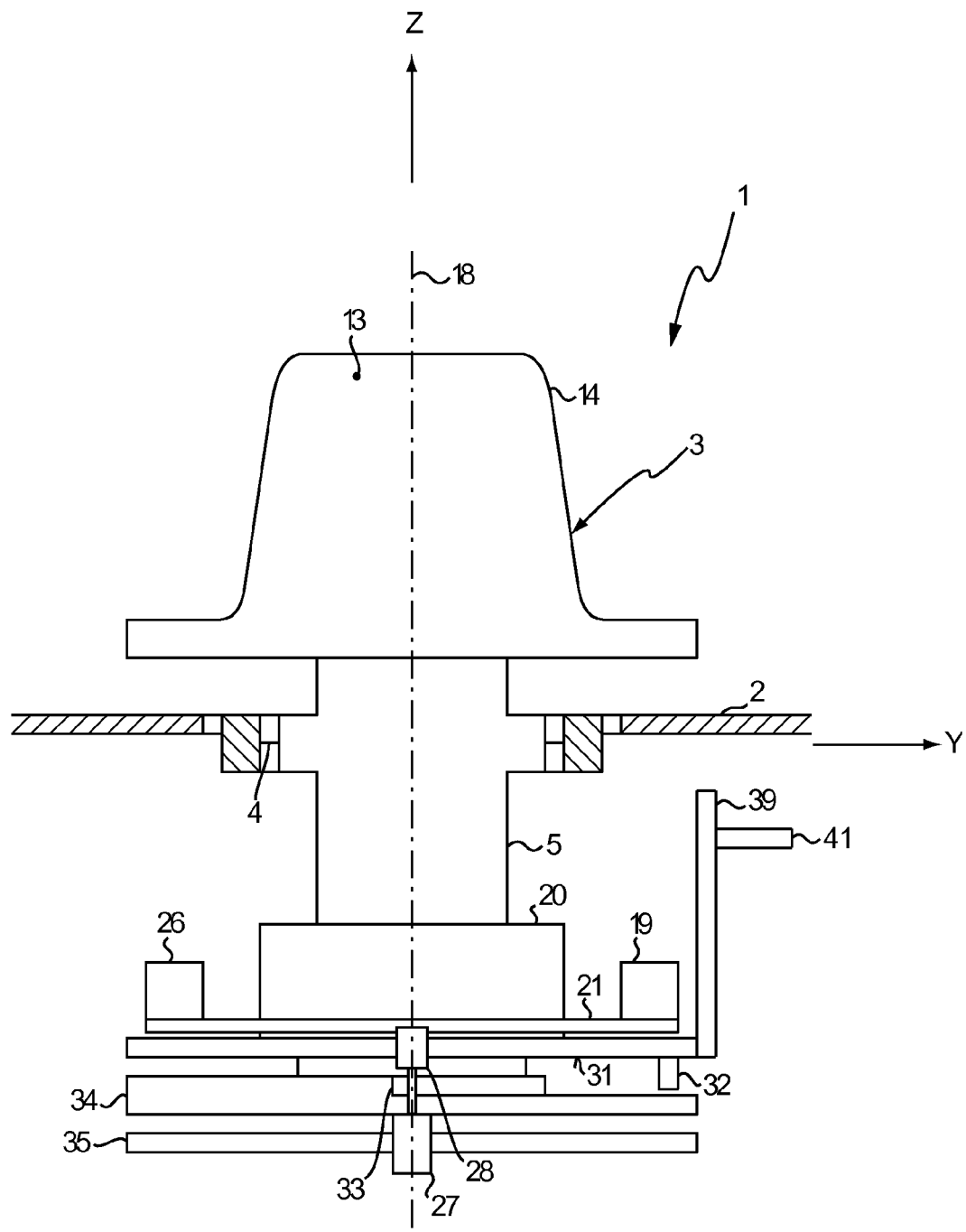

In FIGS. 1 and 2, a construction laser 1 is shown in two views—one from the front and one from the right hand side. The construction laser 1 comprises a base 2 in form of a housing. A laser unit 3—as a means for generating a laser plane—is pivotably mounted to the base 2 using a pivoting system 4 that may be a spherical joint or a gimbal. The pivoting system 4 allows the laser unit 3 to swivel around an X- and a Y-axis—and thus to be tilted in two directions. The laser unit 3 comprises a hollow axle 5. The pivoting system 4 is attached to the axle 5 approximately at midsection. The axle 5 has a lower end 6 and an upper end 7. A laser collimator unit 8 is located in the interior of the hollow axle 5 at the lower end 6. The laser collimator unit 8 comprises a laser diode 9 and a collimator 10. The laser collimator unit 8 generates a collimated laser beam 11 that is directed along the center line 12 of the axle 5 towards a head assembly 13. The head assembly 13 comprises an optically transparent hood 14 that is rotatably mounted to the axle 5 using two bearings 15, 16. A laser beam redirector 17 in the form of a prism is integrated into the hood 14. The laser beam redirector 17 changes the direction of the laser beam 11 by an angle of 90°. Since the laser beam redirector 17 is rotated with the hood 14, a laser plane is generated in which the laser beam 11 rotates around an axis 18 of rotation. Said axis 18 of rotation is concentric to the center line 12 of the axle 5. The head assembly 13 further comprises a rotating motor that rotates the hood via a string (see FIG. 6). The hood 14 is rotated at a speed of several thousand revolutions per minute (rpm).

At the lower end 6 of the axle 5, a tilt sensor 19 is provided. The tilt sensor 19 is mounted to a sensor platform 20 using a printed circuit board 21. The sensor platform 20 is pivotably mounted to the axle 5 using two bearings 22, 23. The bearings 22, 23 are spaced apart at a distance D of one bearing width. Thus the sensor platform 20 and the tilt sensor 19 may be pivoted around the axis 18 of rotation. The distance D between the bearings 22, 23 stabilizes the pivoting movement of the tilt sensor 19. The tilt sensor 19 is aligned with the axis 18 of rotation. In order to achieve this alignment, the interior surface 24 of the sensor platform 20 is preferentially parallel to the axis 18 of rotation and also perpendicular to a mounting surface 25 to which the printed circuit board 21 is attached. To further stabilize the pivoting movement of the tilt sensor 19, a counter weight 26 is provided directly opposite of the tilt sensor 19 on the printed circuit board 21. In particular embodiments, the counter 26 weight may be replaced by second tilt sensor. This second tilt sensor may be used parallel to previous tilt sensor 19 or as a backup. The tilt sensor 19 is configured to measure the tilt of the axis 18 of rotation relative to the X-axis and the Y-axis. In a particular embodiment, two tilt sensors may be provided on the sensor platform 20, wherein one tilt sensor measures the tilt of the axis 18 of rotation about the X-axis and the other tilt sensor measures the tilt of the axis 3 of rotation about the Y-axis. These two tilt sensors may be arranged at a right angle to each other relative to the axis 18 of rotation.

The sensor platform 20 is pivoted by a pivoting motor 27. The pivoting motor 27 is a direct current (DC) motor. A pinion 28 is mounted to the drive shaft 29 of the pivoting motor 27 and is engaged with an external tooth system 30 on the sensor platform 20. On the bottom side 31 of the sensor platform 20, a pin 32 is provided to restrict the pivoting movement of the sensor platform 20. The pin 32 engages with stops 33 that are provided on two defined diametrically opposite positions 54, 55 (see FIG. 3) on the stopping disc 34. In this figure, the stopping disc is shown to be separate from the axle 5. In a particular embodiment, the stopping disc 34 may be provided as an integral part of the axle 5. These defined positions 54, 55 are aligned to the X- and Y-axis around which the laser unit 3 may swivel. In operation the pivoting motor 27 is always powered with a minimum current to generate a mechanical torque which pushes the pin 32 against one of the stops 33.

A main printed circuit board 35 is mounted to the lower end of the axle 5. Attached and/or connected to this main printed circuit board 35 is a control unit 36, the laser diode 9, the pivoting motor 27 and the tilt sensor 19 (via wires 37 and the other printed circuit board 21).

Two leveling arms 38, 39 that are perpendicular to each other are attached to the stopping disc 34. The leveling arms 38, 39 are provided with leveling pins 40, 41 that engage with leveling drives for tilting the laser unit 3 relative to the X-axis and the Y-axis. The leveling drives are not shown in the figures.

Figure 3:
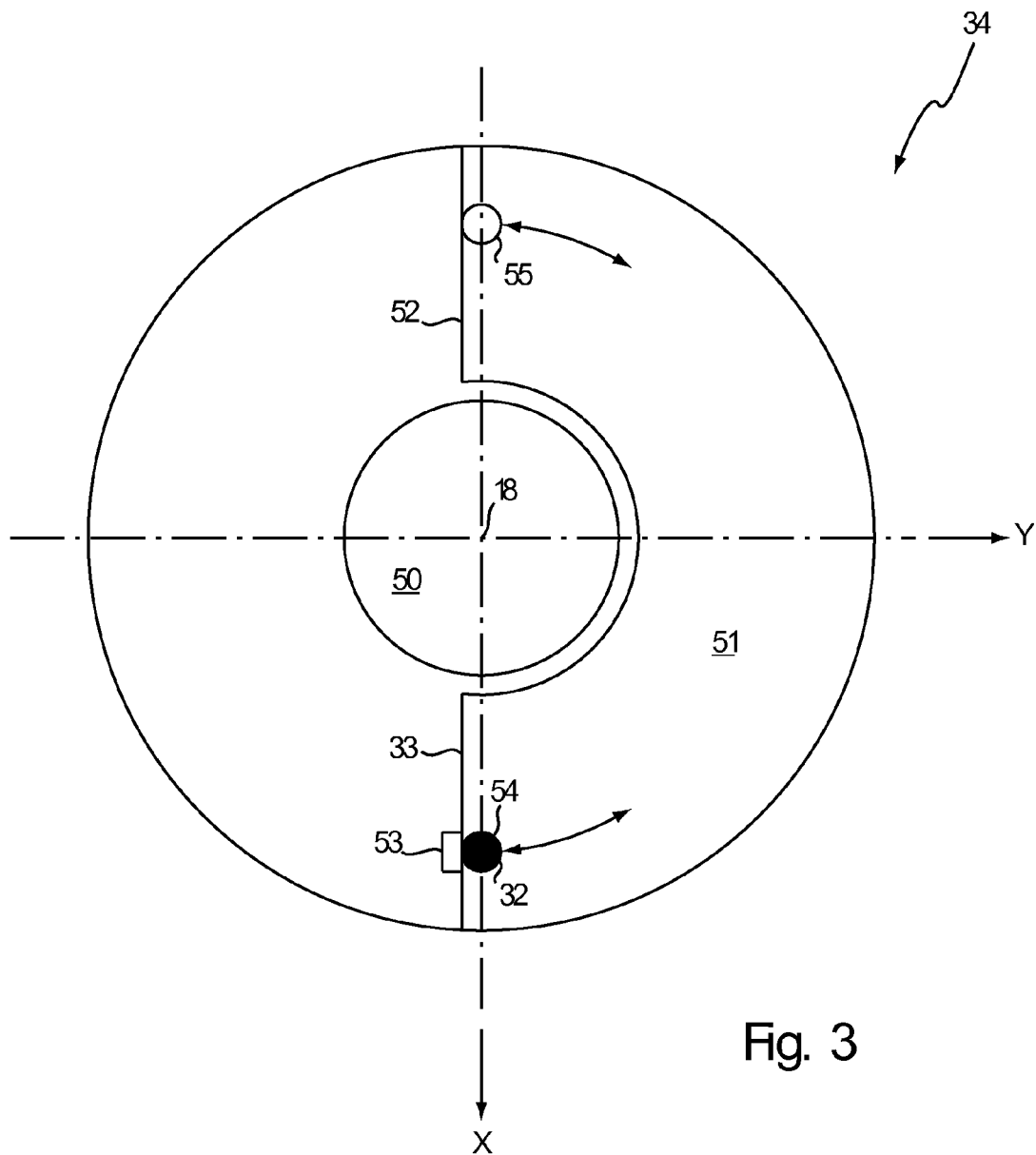
FIG. 3 is a stopping disc for limiting the pivoting movement of the sensor platform.

At start-up, the tilt sensor 19 is pivoted into one defined position that is the main position 54 (see FIG. 3). The laser unit 3 is pivoted according to the measurements of the tilt sensor 19 in the main position 54. To calibrate the tilt sensor 19 while the laser unit 3 is in operation, the tilt sensor 19 is pivoted upon a trigger signal into the other defined position 55 to measure the tilt of the axis 18 of rotation at that position which is used as a compensating value for the tilt measurements of the tilt sensor 19 in the main position 54. Afterwards, the tilt sensor 19 is pivoted back to its main position 54. The trigger signal can be a change in temperature, a periodic signal of a timer, and/or a signal generated at start-up of the construction laser.

The stopping disc 34 is shown in FIG. 3 in a top view. The stopping disc 34 has a hole 50 in the middle for mounting it to the axle 5. A clearance 51 is provided for the pin 32 which is mounted to the bottom side 31 of the sensor platform 20. The clearance 51 has the shape of a portion of a ring disc. To restrict the pivoting movement of the sensor platform 20 in two defined positions 54, 55, two stops 33, 52 are provided against which the pin 32 may abut.

In a particular embodiment, a magnet 53 is integrated into one of the stops 33 to attract the pin 32. Once the pin 32 is attracted, the pin 32 is held at the stop 33. It is no longer required to generate a torque with the pivoting motor 27. When the sensor platform 20 is pivoted, the motor force overcomes the magnetic force and moves the sensor platform 20 into the other defined position 55. A constant force is applied by the pivoting motor 27 to hold the sensor platform 20 in that defined position 55 until the tilt measurement is completed. Then the pivoting motor 27 pivots the sensor platform 20 back to its main position 54 where the pin 32 abuts against the magnet 53.

Figure 4:
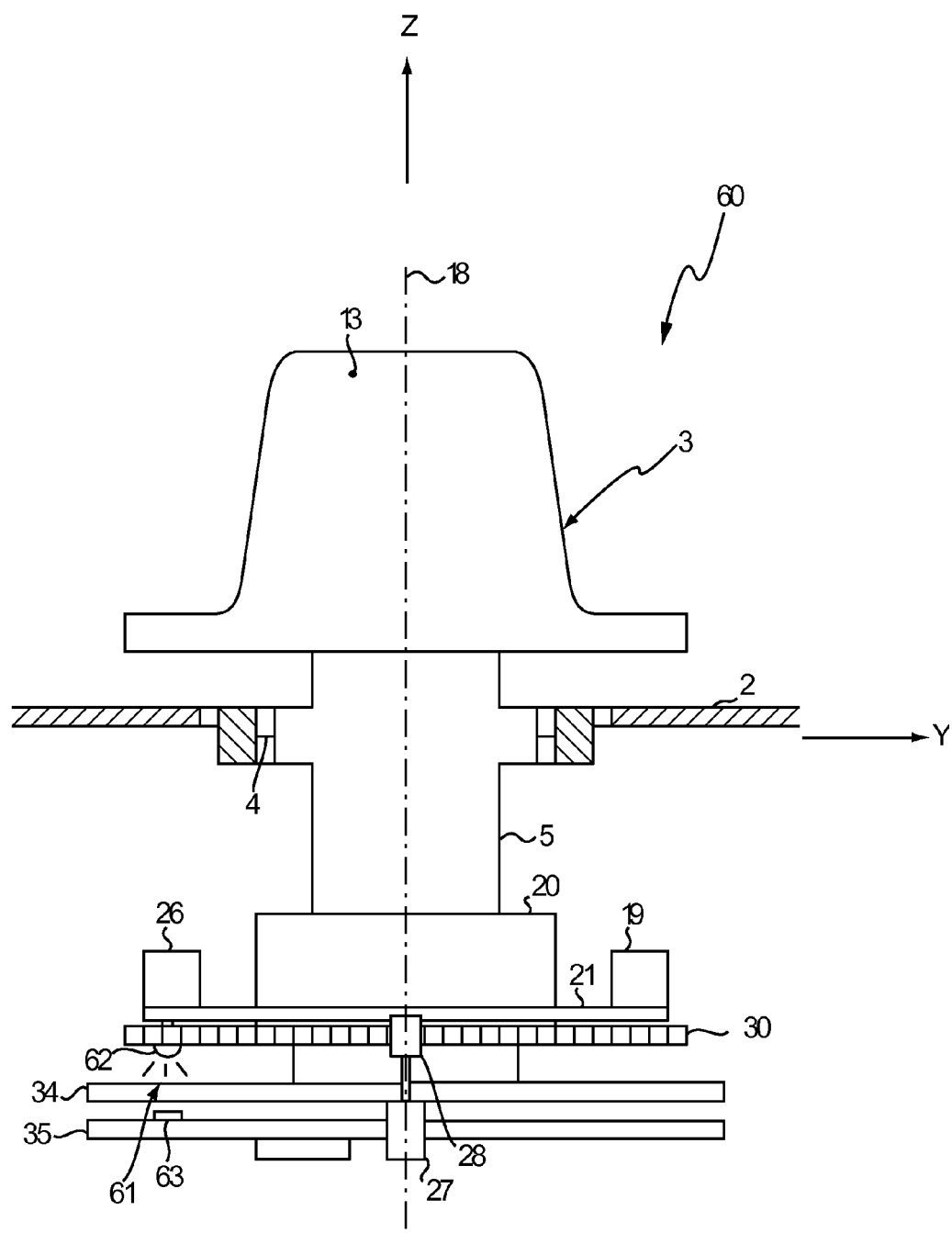
FIG. 4 is an embodiment of the construction laser with a stepper motor and a position switching system.

In FIG. 4, another embodiment of the construction laser 60 is shown in a side view. In this embodiment, the pivoting motor 27 is a stepper motor. A certain number of steps corresponds to a rotation of the tilt sensor 19 into the next desired defined position 54, 55. To be able to reset a counter of the stepper motor 27, an electrical position switching system 61 is used. The position switching system comprises a light emitting diode (LED) 62 and a photo detector 63. The LED 62 is located at the bottom side 31 of the sensor platform 19 and is connected to the printed circuit board 21 on the sensor platform 20. The photo detector 63 is provided on the main printed circuit board 35. During operation, the sensor platform 21 is pivoted until the photo detector 63 receives light from the LED 62. This will prompt the control unit 36 to reset the counter of the pivoting motor 27. The tilt sensor 19 is then pivoted into one of the defined positions 54, 55. The number of steps required to reach the defined position 54, 55 is stored in the control unit 36 and will be used from then on to accurately pivot the tilt sensor 19 into the defined positions 54, 55.

In these embodiments, the stepper motor 27 and the position switching system 61 replace the pin 32 and the stopping disc 34 of the previous FIGS. 1 and 2.

Figure 5A:
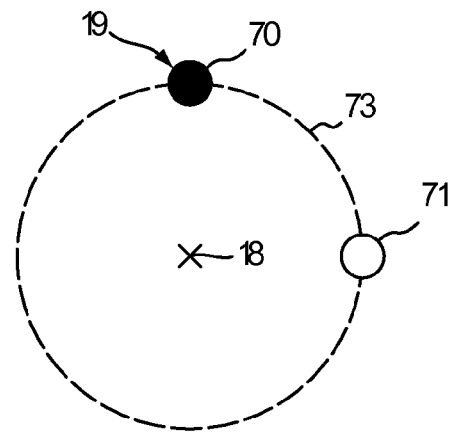
FIGS. 5a to 5d various positions of defined positions.
Figure 5B:
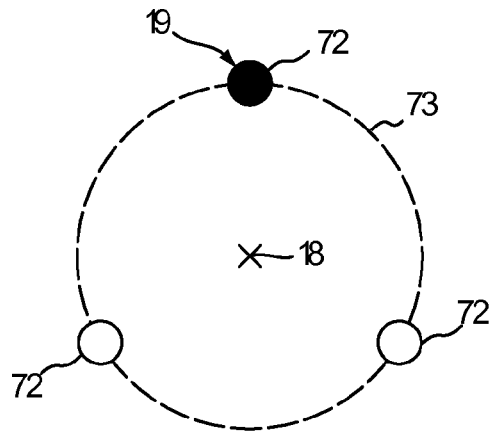
Figure 5C:
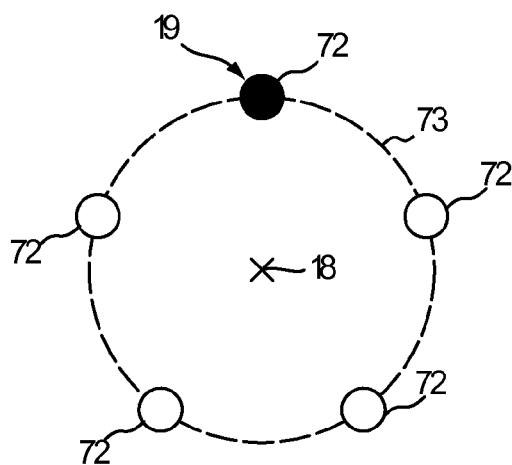
Figure 5D:
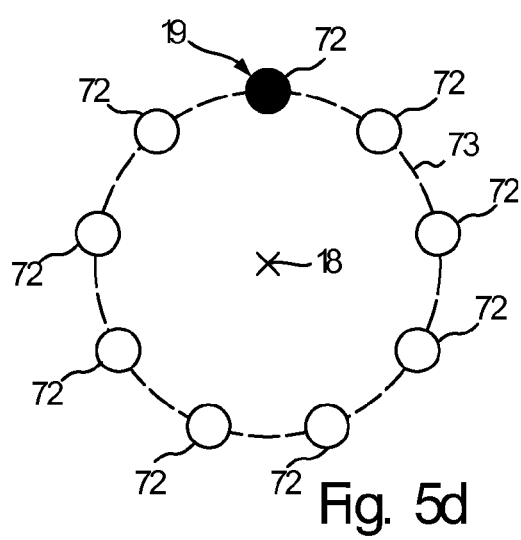

The defined positions 54, 55 into which the tilt sensor 19 may be pivoted may be exactly opposite of each other relative to the axis 18 of rotation as shown in FIG. 3, but the defined positions 70, 71 may also be at a right angle to each other (see FIG. 5a). Furthermore, more than two defined positions 72 may be provided, as is shown in FIGS. 5b to 5d. As described above, an uneven number of three or more defined positions 72 is preferred for very precise tilt measurements of the axis 18 of rotation. Those defined positions 72 are evenly distributed on a reference circle 73 concentric to the axis 18 of rotation.

Figure 6:
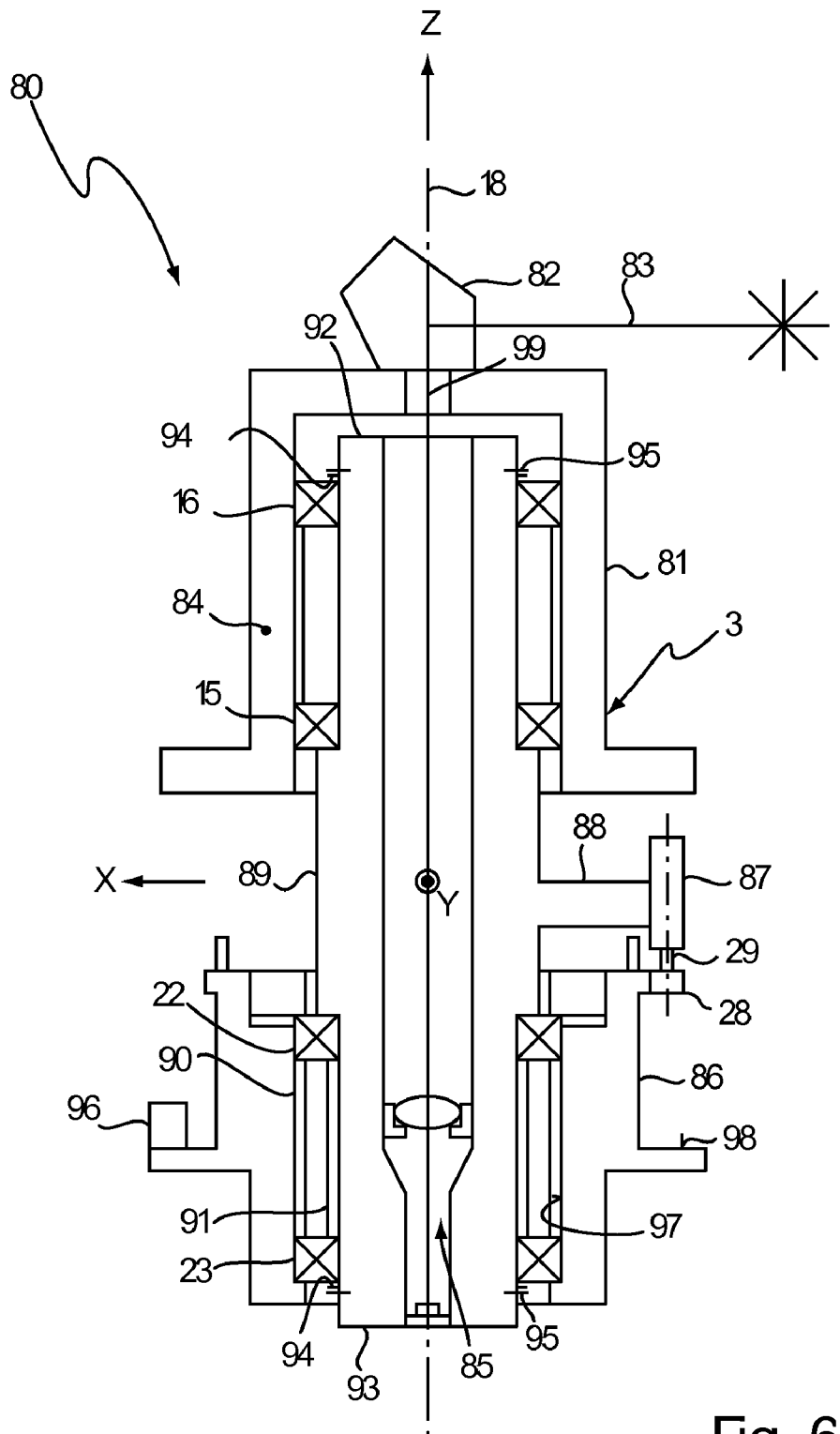
FIG. 6 shows a construction laser in which the pivoting motor is mounted to the axle.

In the embodiment of FIG. 6, a construction laser 80 with a head assembly 81 is provided with a pentaprism 82 for redirecting the laser beam 83. The pentaprism 82 is mounted on top of a hood 84. The laser beam 83 is generated by the laser collimator unit 85 is guided through a hole 99 in the hood 84 directly to the pentaprism 82.

The sensor platform 86 is pivoted by a pivoting motor 87 that is mounted to an arm 88 that is provided on one side of an axle 89 at midsection.

The sensor platform 86 is mounted to the axle 89 via two radial bearings 22, 23 which are kept apart by two bushings 90, 91 that are contacting the outer and inner rings of the bearings 22, 23. The bushings 90, 91 are of slightly different lengths. The bearings 22, 23 at the upper end 92 and at the lower end 93 of the axle 89 are held by wave springs 94 and retaining rings 95 which are placed in grooves. The wave springs 94 bias against the inner rings of the outer bearings 16, 23 to create a preload on the bearings 15, 16, 22, 23.

A tilt sensor 96 is aligned with the axis 18 of rotation. An interior surface 97 of the sensor platform 86 is advantageously arranged to be parallel to the axis 18 of rotation and is machined to be perpendicular to a tilt sensor mounting surface 98.

Figure 7:
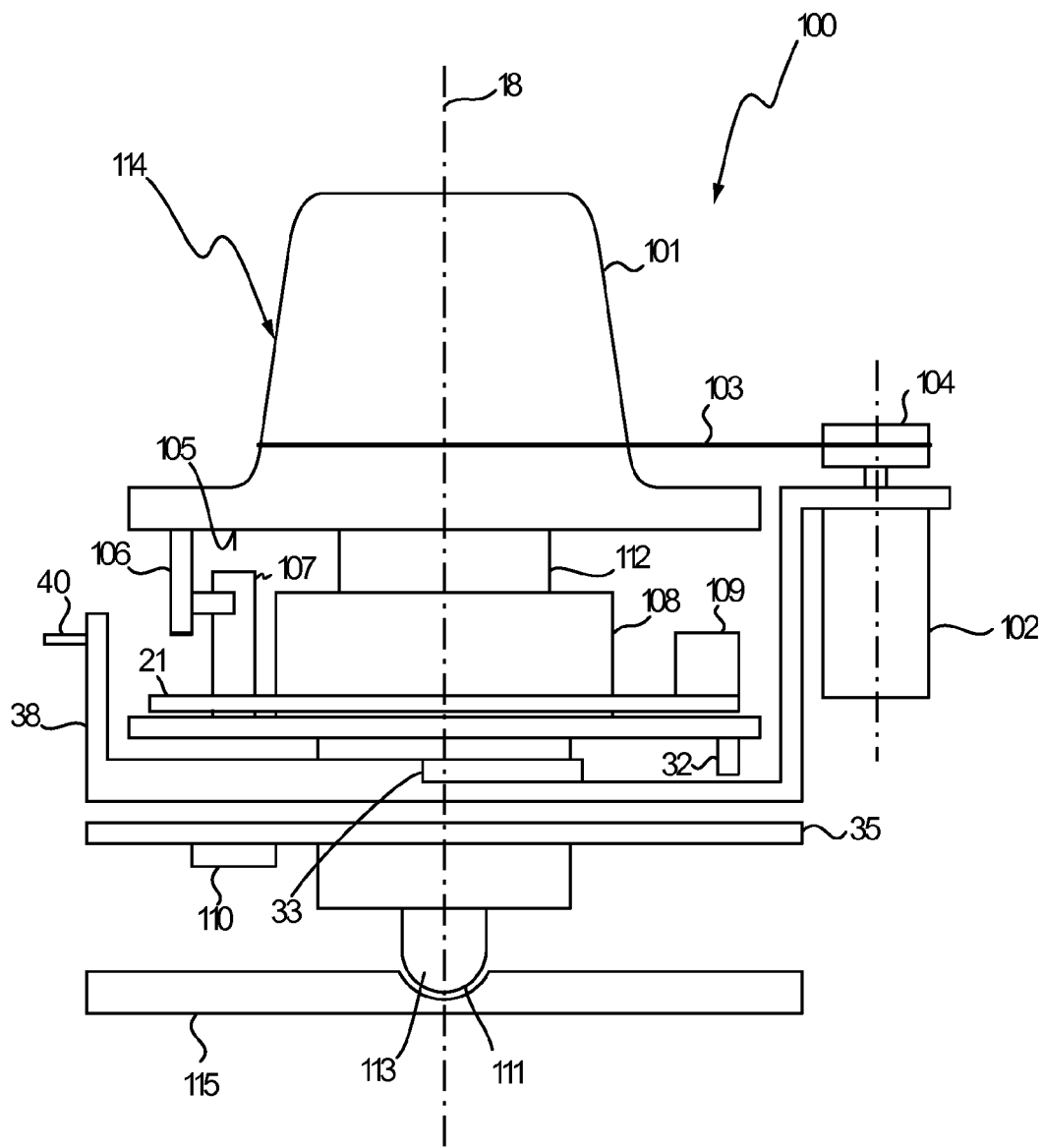
FIG. 7 shows a construction laser in which the sensor platform is pivoted by an engaging pin that is provided on a head assembly.

Referring now to FIG. 7, a further embodiment of a construction laser 100 is shown in which a hood 101 is rotated by a rotating motor 102 via a string 103 or belt using a pulley 104. At the bottom side 105 of the hood 101 an engaging pin 106 is provided which engages with a mechanical actuator 107 fixed to a sensor platform 108 to pivot the tilt sensor 109. The mechanical actuator 107 may be configured with a counter to pivot the tilt sensor 109 only after the engaging pin 106 has passed a certain number of times.

In another embodiment, the control unit 110 is configured to lock the mechanical actuator 107 into the engaging pin 106. The direction of turn of the rotating motor 102 may be reversible to pivot the tilt sensor 109 into a defined position 54, 55 and back again. After each pivoting movement the mechanical actuator 107 is disengaged from the engaging pin 106 by the control unit 110. Afterwards the speed of the rotating motor 102 returns to normal operational levels of several thousand revolutions per minute in order to generate the laser plane.

At the lower end 111 of an axle 112, a ball joint 113 is provided for pivotably mounting the laser unit 114 to a base 115.

We claim:

1. A rotating construction laser, comprising:
a base;
a laser unit for emitting a laser beam rotating around an axis of rotation so that the rotating laser beam defines a laser plane, wherein the laser unit is built and tiltably arranged to the base in such a way, that the axis is tiltable in at least one direction; and
a tilt sensor for measuring the tilt of the axis, wherein the tilt sensor is supported by a sensor platform being pivotable with respect to the laser unit around the axis between at least two defined pivoting-positions in such a way that the tilt of the axis is measurable by the tilt sensor in the at least two pivoting-positions.

2. A rotating construction laser according to claim 1, wherein the laser unit is built in such a way, that the laser beam rotates around the axis with a rotational speed of at least 120 rpm.

3. A rotating construction laser according to claim 1, wherein the laser unit is built in such a way, that the laser beam rotates around the axis with a rotational speed of at least 500 rpm.

4. A rotating construction laser according to claim 1, wherein the laser unit is built in such a way, that the laser beam rotates around the axis with a rotational speed of at least 1000 rpm.

5. A rotating construction laser according to claim 1, further comprising:
a calculation unit being designed in such a way, that:
a tilt value for the axis is derived by considering a measurement taken by the tilt sensor in each of the at least two pivoting-positions; and/or
the tilt sensor is calibrated, or re-calibrated, by considering a measurement taken by the tilt sensor in each of the at least two pivoting-positions.

6. A rotating construction laser according to claim 1, wherein two positions of the at least two pivoting-positions are diametrically opposite of each other relative to the axis.

7. A rotating construction laser according to claim 1, wherein the sensor platform is pivotable with respect to the laser unit around the axis between at least three defined pivoting-positions.

8. A rotating construction laser according to claim 7, wherein the laser unit comprises an axle that is concentric to the axis, wherein the sensor platform is pivotably mounted to the axle.

9. A rotating construction laser according to claim 7, wherein two bearings are located between the sensor platform and the axle, wherein the bearings are arranged at a distance from another of at least one bearing width.

10. A rotating construction laser according to claim 1, wherein the sensor platform is pivotable with respect to the laser unit around the axis between at least three defined pivoting-positions between an uneven number of defined pivoting-positions.

11. A rotating construction laser according to claim 1, wherein a printed circuit board is provided between the tilt sensor and the sensor platform.

12. A rotating construction laser according to claim 1, wherein the tilt sensor is pivoted by an engaging pin that is provided on a rotating part of the laser unit.

13. A rotating construction laser according to claim 1, wherein the sensor platform is pivoted by a pivoting motor.

14. A method for determining a tilt for an axis of rotation of a rotating construction laser, the rotating construction laser comprising:
a base;
a laser unit for emitting a laser beam rotating around the axis so that the rotating laser beam defines a laser plane, wherein the laser unit is built and tiltably arranged to the base in such a way, that the axis is tiltable; and
a tilt sensor for measuring the tilt of the axis, wherein the tilt sensor is pivotable with respect to the laser unit around the axis between at least two defined pivoting-positions, the method comprising:
measuring the tilt by the tilt sensor in each of the at least two pivoting-positions; and
deriving the tilt value for the axis by considering the measurements taken by the tilt sensor in the at least two pivoting-positions.

15. A method according to claim 14, wherein the tilt sensor is calibrated, or re-calibrated, by considering the measurements taken by the tilt sensor in the at least two pivoting-positions.

16. A method according to claim 14, wherein two positions of the at least two pivoting-positions are opposite of each other relative to the axis.

17. A method according to claim 14, wherein the tilt sensor is pivotable with respect to the laser unit around the axis between at least three defined pivoting-positions, and wherein the tilt value for the axis is derived by considering a measurement taken by the tilt sensor in each of the defined pivoting-positions.

18. A method according to claim 14, wherein the tilt sensor is pivotable with respect to the laser unit around the axis between at least three defined pivoting-positions between an uneven number of defined pivoting-positions, and wherein the tilt value for the axis is derived by considering a measurement taken by the tilt sensor in each of the defined pivoting-positions.

19. A method according to claim 14, wherein the results of the tilt measurements at the defined pivoting-positions are used to calibrate the sensitivity of: the tilt sensor.

20. A method according to claim 14, wherein the laser beam rotates around the axis with a rotational speed of at least 120 rpm.

21. A method according to claim 14, wherein the laser beam rotates around the axis with a rotational speed of at least 500 rpm.

22. A method according to claim 14, wherein the laser beam rotates around the axis with a rotational speed of at least 1000 rpm.

* * * * *

UNITED STATES PATENT AND TRADEMARK OFFICE
CERTIFICATE OF CORRECTION

PATENT NO. : 8,407,903 B2
APPLICATION NO. : 13/002409
DATED : April 2, 2013
INVENTOR(S) : Koleszar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 240 days.

Signed and Sealed this
First Day of September, 2015

Michelle K. Lee
*Director of the United States Patent and Trademark Office*